United States Patent [19]

Horiki et al.

[11] Patent Number: 4,714,633

[45] Date of Patent: Dec. 22, 1987

[54] EXPANDING AND SHRINKING MEMBER

[75] Inventors: Seinosuke Horiki; Reiji Makino; Kuninori Ito, all of Nagoya; Tetsuji Unno, Aichi, all of Japan

[73] Assignee: Nagoya Oilchemical Co., Ltd., Tokai, Japan

[21] Appl. No.: 57,012

[22] Filed: Jun. 1, 1987

[30] Foreign Application Priority Data

Jun. 3, 1986 [JP] Japan ........................... 61-084506[U]

[51] Int. Cl.[4] ......................... B05D 1/32; B05D 5/00; B32B 7/05

[52] U.S. Cl. ....................................... 427/282; 428/40; 428/159; 428/314.4; 428/317.3; 428/352; 428/354; 428/913

[58] Field of Search ......................... 118/505; 427/282; 428/40, 158, 159, 160, 314.4, 314.8, 317.3, 352, 354, 913

[56] References Cited

U.S. PATENT DOCUMENTS

| | | | |
|---|---|---|---|
| 3,902,484 | 9/1975 | Winters | 428/160 |
| 4,139,099 | 2/1979 | Daly et al. | 428/40 |
| 4,151,992 | 5/1979 | Camilleri | 428/160 |
| 4,390,576 | 6/1983 | Hutter, III | 428/40 |
| 4,507,330 | 3/1985 | Schaaf | 427/282 |
| 4,666,164 | 5/1987 | Becker et al. | 428/317.3 |

FOREIGN PATENT DOCUMENTS

| | | | |
|---|---|---|---|
| 747341 | 11/1966 | Canada | 428/40 |
| 2362584 | 6/1975 | Fed. Rep. of Germany | 428/40 |

*Primary Examiner*—William J. Van Balen
*Attorney, Agent, or Firm*—Cooper, Dunham, Griffin & Moran

[57] ABSTRACT

An expanding and shrinking member useful as a masking member is provided in the present invention. Said expanding and shrinking member comprises a panel which consists of a thermoplastic foam having closed cells and (a) cavity(ies) is(are) formed on one side of said panel and an adhesive layer is formed on the other side of said panel.

9 Claims, 9 Drawing Figures

EXPANDING AND SHRINKING MEMBER

BACKGROUND OF THE INVENTION

The present invention relates to an expanding and shrinking member useful as a masking member. More particularly, the present invention relates to an expanding and shrinking member comprising a panel which consists of a thermoplastic foam having closed cells and cavity(ies) is(are) formed one side of said panel and an adhesive layer is formed on the other side of said panel.

When a surface treatment such as coating, plating, vacuum evaporating and the like is effected on the surface of an article, and if said surface of said article has part(s) on which said surface treatment should not be effected for the reason that said surface treatment spoils the appearance of said article and/or obstructs the firm attachment of parts such as bolts, nuts, brackets, frames and the like, and so on, said part(s) of said surface of said article maybe covered and protected with said masking member.

DESCRIPTION OF THE PRIOR ART

Hitherto, adhesive tape has been used as a masking member to protect said part(s) of said surface of said article from surface treatment. Namely, adhesive tape is attached to said part(s) of said surface of said article to protect it from said surface treatment and, after said surface treatment, said adhesive tape is removed from said port(s) of said surface of said article. Said part(s) may be effected by said surface treatment since said part(s) was (were) covered with adhesive tape during said surface treatment.

Said adhesive tape as a masking member has faults. In cases where the part to be protected form said surface treatment is wide, it is troublesome to attach adhesive tape to the part(s) to be protected and remove said adhesive tape from said part(s) since a number of strips of adhesive tape must be attached to said part(s) to cover the whole of said part(s), and further, adhesive tape attached to said part(s) to be protected is buried in the layer of said surface treatment and it is very difficult to find said buried adhesive tape and, of course, it is very difficult to remove said buried adhesive tape.

Still further, it is very difficult to cover only the necessary parts of a metal structure by adhesive tape resulting in that parts which are not effected by said surface treatment may remain.

SUMMARY OF THE INVENTION

Accordingly, an object of the present invention is to save trouble when the masking member(s) is(are) attached/removed to/from part(s) to be protected.

According to the present invention, there is provided an expanding and shrinking member useful as a masking member comprising a panel which consists of a thermoplastic foam having closed cells and (a) cavity(ies) is(are) formed on one side of said panel and an adhesive layer is formed on the other side of said panel.

DETAILED DESCRIPTION

FIG. 1 to FIG. 6 relate to the first embodiment of the present invention.

Referring now to FIG. 1 to FIG. 6, an expanding and shrinking member (103) comprises a square panel (103A) which consists of a thermoplastic foam having closed cells and a square cavity (103B) is formed in the center of one side of said panel (103A) and an adhesive layer (103C) is formed on the other side of said panel (103A).

Said thermoplastic foam used as material of said panel (103A) may be such as a polystyrene foam, a polyethylene foam, a polypropylene foam, a polyvinylacetate foam and the like and said thermoplastic foam has closed cells.

Said panel (103A) may be produced by expansion molding, cutting out said panel from a block of said thermoplastic foam, and the like. Further said cavity (103B) may be formed simultaneously with said expansion molding of said panel (103A) or formed by cutting after said panel is molded or cut out.

Said expanding and shrinking member (103) may be advantageously provided by covering said adhesive layer (103C) with a release sheet (103D) such as a polyethylene film, a polypropylene film, a release paper, and the like to prevent sticking to another article, the hands of workers and the like when the masking members are transported, stocked, and handled.

Further, said expanding and shrinking member (103) may be colored by a suitable color for the purpose of selection the specified member according to the part to be protected. Further, the colored member (103) may be easily found when said member (103) is removed after surface treatment.

When said expanding and shrinking member (103) is used, the release sheet (103D) may be firstly removed from the adhesive layer (103C) of said expanding and shrinking member (103) and said member (103) may be attached to a part (102) of the surface of an article (101) to be protected from said surface treatment by said adhesive layer (103C) of said member (103).

Figure 1:
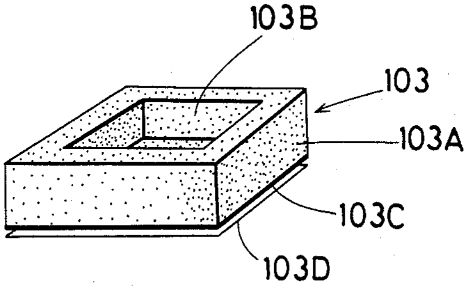
FIG. 1 is a perspective view of a first embodiment of the present invention.
Figure 2:
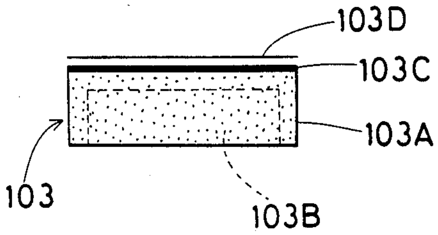
FIG. 2 is a side view of the first embodiment of the present invention.
Figure 3:
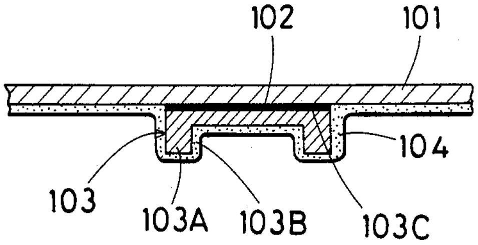
FIG. 3 is a side sectional view of the first embodiment wherein the expanding and shrinking member is attached to the surface of an article.
Figure 4:
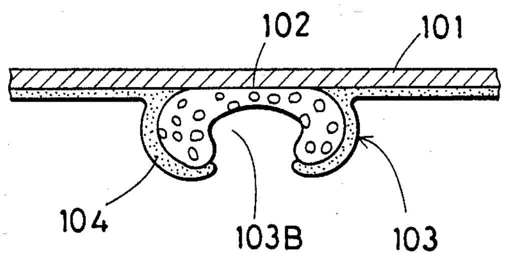
FIG. 4 is a side sectional view of the first embodiment wherein the expanding and shrinking member is expanding.
Figure 5:
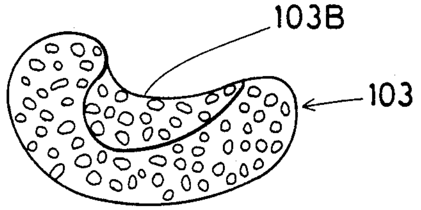
FIG. 5 is a perspective view of the first embodiment wherein the expanding and shrinking member is expanding.
Figure 6:
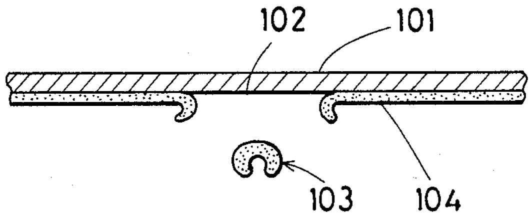
FIG. 6 is a side sectional view of the first embodiment wherein the expanding and shrinking member is shrinking.

After said surface treatment, said expanding and shrinking member (103) may be heated at a temperature higher than the softening point of the thermoplastic foam of said member (103) and said expanding and shrinking member (103) may be softened. Simultaneously gas contained in the closed cells may expand by the heating and therefore said member (103) may expand. When said expanding and shrinking member (103) expands, said member (103) may bend to the side having a cavity (103B) as shown in FIG. 4 and FIG. 5. Therefore, said member (103) tends to separate from the part (102) of the article (101). Said expanding and bending member (103) may break a film 9104) of the surface treatment and further, said expanding gas may break the walls of the closed cells of the thermoplastic foam to expand. When said gas expands from the thermoplastic foam, the member (103) may shrink to separate naturally from said part (102) of said article (101) as shown in FIG. 6.

Figure 7:
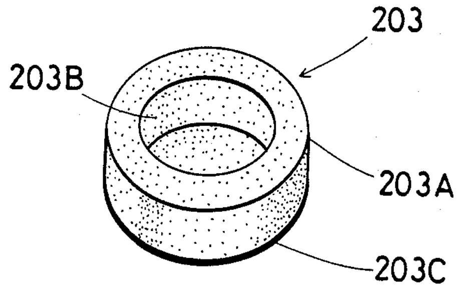
FIG. 7 is a perspective view of a second embodiment.

FIG. 7 shows an expanding and shrinking member (203) of the second embodiment and said expanding and shrinking member (203) comprises a circular panel (203A) having a circular cavity (203B) in the center of one side and an adhesive layer (203C) on the other side.

Figure 8:
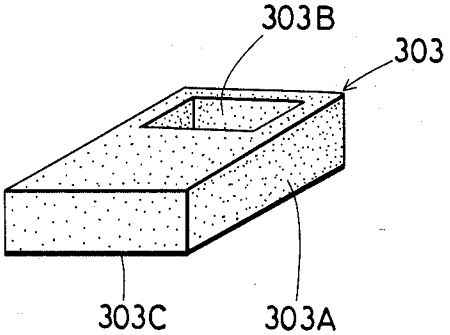
FIG. 8 is a perspective view of a third embodiment.

FIG. 8 shows an expanding and shrinking member (303) of the third embodiment and said expanding and shrinking member (303) comprises a square panel (303A) having a square cavity (303B) in a biased position on one side and an adhesive layer (303C) on the other side.

Figure 9:
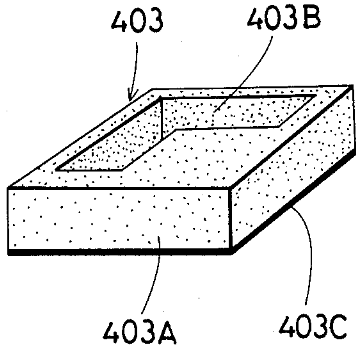
FIG. 9 is a perspective view of a fourth embodiment.

FIG. 9 shows an expanding and shrinking member (403) of the fourth embodiment and said expanding and shrinking member (403) comprises a square panel (403A) having an L-shaped cavity (403B) on one side and an adhesive layer (403C) on the other side.

We claim:

1. An expanding and shrinking member comprises a panel which consists of a thermoplastic foam having closed cells and (a) cavity(ies) is(are) formed on one side of said panel and an adhesive layer is formed on the other side of said panel.

2. An expanding and shrinking member of claim 1, wherein said thermoplastic foam is polystyrene foam.

3. An expanding and shrinking member of claim 1, wherein said adhesive layer is covered with a release sheet.

4. An expanding and shrinking member of claim 1, wherein said panel is colored by a suitable color.

5. An expanding and shrinking member of claim 1, wherein said expanding shrinking member is used as a masking member.

6. A method of surface treatment comprising attaching the expanding and shrinking member of claim 1 to a part of the surface of an article to be protected from a surface treatment by the adhesive layer of said member effecting said surface treatment on said surface of the article, and heating said expanding and shrinking member to expand and then shrink and separate from said part of said surface of said article.

7. A method of surface treatment of claim 6, wherein said thermoplastic foam is polystyrene foam.

8. A method of surface treatment of claim 6, wherein said adhesive layer is covered with a release sheet.

9. A method of surface treatment of claim 6, wherein said panel is colored by a suitable color.

* * * * *